United States Patent Office 2,702,504
Patented Feb. 22, 1955

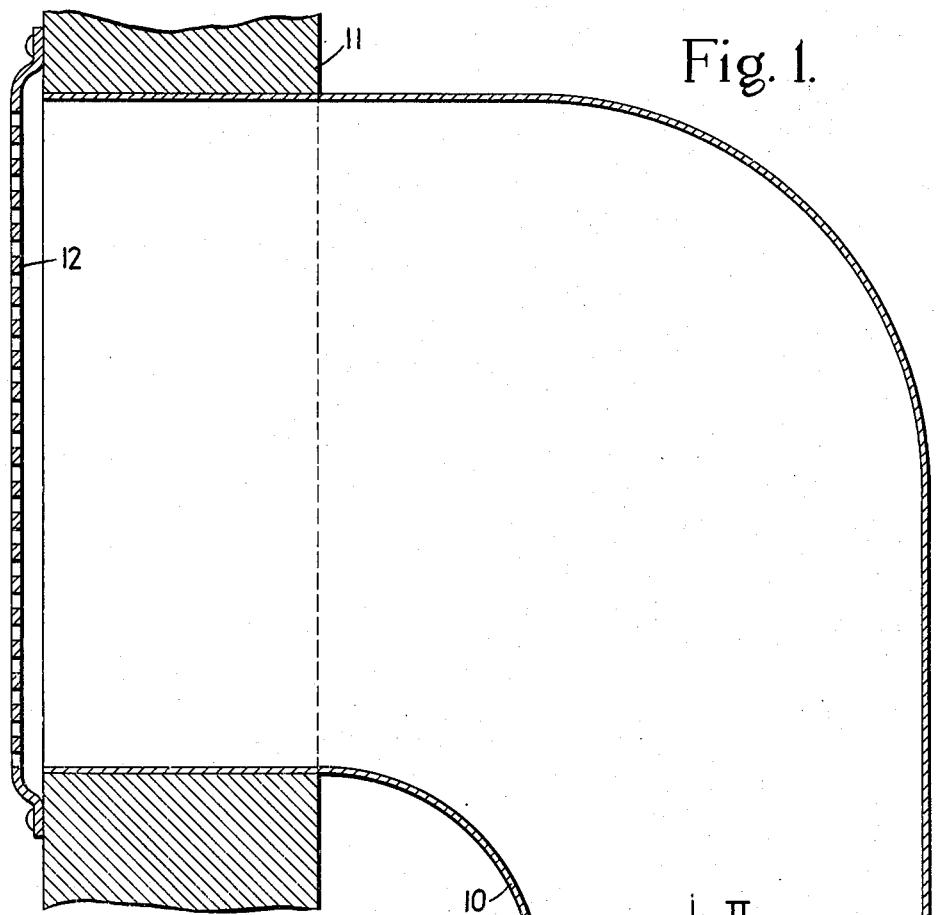
Fig. 1.
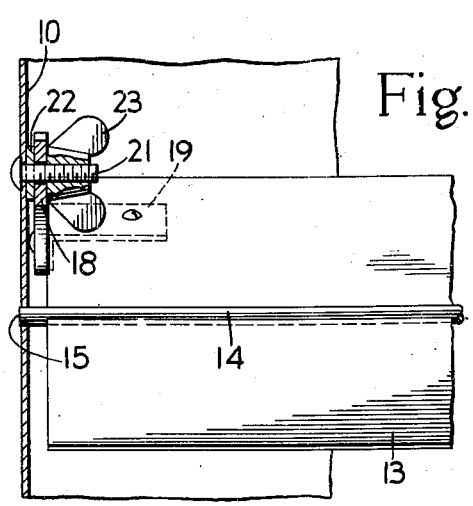
Fig. 2.
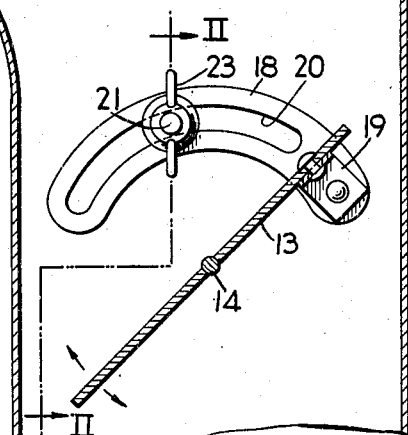
INVENTOR.
Joseph R. Guildford

2,702,504

AIR DUCT CONTROL MEANS

Joseph R. Guildford, Buffalo, N. Y.

Application April 16, 1952, Serial No. 282,627

6 Claims. (Cl. 98—41)

This invention relates to ventilation system branch air duct control means and particularly to a damper valve construction with novel means for regulating and adjusting the same.

One of the objects of my invention is to provide a damper regulating means which is ordinarily inaccessible to tampering by persons who are not authorized or qualified to make changes in damper adjustments. To this end I provide a damper regulating and locking means which is out of sight of those persons who are unauthorized to regulate or adjust the same and yet may readily be regulated by authorized personnel without the use of tools of any kind and, generally speaking, by merely reaching into a duct containing the damper and without the need for visual observation or inspection.

Further, the regulating means of the present invention provides a full range of adjustment from fully open to fully closed position, the damper being readily lockable in any desired position within those limits. The construction and arrangement of the damper locking means of the present invention is further so arranged as to require a minimum of parts and also is such that the duct itself is not encumbered or burdened with undue special fabrication or with joints or apertures which might unduly affect the desired air-tight construction of the duct.

It is to be understood that after a damper adjustment has been made the end or head of the ventilation duct is closed off and protected by the usual grille or grating member, thereby providing additional security against unauthorized tampering with the damper adjustment.

Various other objects and advantages resulting from the application of the principles of the present invention will occur to those skilled in this art from a consideration of the accompanying drawing and the following detailed specification. However, it is to be understood that the form of my invention set forth in detail herein is by way of example only and that the invention is not limited thereto or otherwise excepting as defined in the appended claims.

In the drawing:

Fig. 1 is a fragmentary cross-sectional view of the terminal portion of a ventilation system air duct taken on a vertical plane and showing one form of the duct control means of the present invention associated therewith; and Fig. 2 is a fragmentary cross-sectional view taken generally along the line II—II of Fig. 1.

Like characters of reference denote like parts and the numeral 10 designates an air duct or similar conduit, in the present instance of rectangular cross-section, opening through a building wall 11 and fitted at its outlet or inlet end, as the case may be, with a removable protective grille 12.

A valving plate 13 has a central rod member 14 fixed thereto in any convenient manner to provide oppositely projecting pintles 15 which have rotatable bearing in the opposite side walls of duct 10 as clearly shown in Fig. 2. The valving plate 13 is shown in an intermediate position in Fig. 1 and may be selectively pivoted in either direction to a fully closed horizontal position, as viewed in Fig. 1, or to a fully open vertical position, by virtue of the pivotal mounting provided by pintles 15.

The pivoted valving plate 13 has fixed thereto a quadrant or side arm perforated member 18 which extends generally along an arc struck from or near the axis of the pintles 15 and is disposed to lie flatwise just inside of one of the side walls of the duct 10. Quadrant 18 may be fixed to valving plate 13 in any desired manner as by means of an angle bracket 19 which in the present instance is riveted to the plate 13 and loosely riveted to quadrant 18, respectively.

Quadrant 18 is provided with an elongated slot 20 and a bolt or screw 21 is secured to the adjacent wall of duct 10 so that its threaded shank portion projects into duct 10 and through the slot 20. Bolt or screw 21 may be soldered or welded directly to or against the wall of duct 10, or, as in Fig. 2, the bolt or screw may be secured in a suitable opening in the wall of duct 10 by cooperation between its head and a nut 22. A wing nut 23 selectively clamps the elongated slotted member against nut 22 or directly against the interior wall of duct 10 if the nut 22 is not employed.

An authorized person, knowing the location and arrangement of valving plate 13 and its adjustment means, can remove grille 12, reach into duct 10, and unlock, adjust or readjust the damper and relock the same with one hand and without the need for visual observation or inspection or the need for the use of any tools, special or otherwise.

I claim:

1. Air flow regulating means for a rectangular ventilation duct comprising a damper plate and means mounting said plate in said duct for pivotal movement about a transverse axis, a locking plate fixed to a side edge of said damper plate at a point spaced from said transverse axis, said locking plate lying adjacent to an interior wall of said duct in a plane at right angles to said pivot axis, said locking plate having an arcuate slot therein generally concentric with said transverse axis, a screw element fixed to said duct and extending through said arcuate slot, and locking means comprising a thumb nut engaging said screw means to selectively clamp the same in selected positions relative to said arcuate slot.

2. Air flow regulating means for a rectangular ventilation duct comprising a damper plate and means mounting said plate in said duct for pivotal movement about a transverse axis, a locking plate fixed to a side edge of said damper plate at a point spaced from said transverse axis, said locking plate lying adjacent to an interior wall of said duct in a plane at right angles to said pivot axis, said locking plate having an arcuate slot therein generally concentric with said transverse axis, means fixed to said duct and extending through said arcuate slot, and locking means engaging said last-mentioned means and manually movable to selectively clamp the same in selected positions relative to said arcuate slot.

3. Air flow regulating means for a rectangular ventilation duct comprising a damper plate and means mounting said plate for pivotal movement about a transverse axis, a locking plate fixed to said damper plate adjacent a marginal edge thereof and spaced from said transverse axis and extending in a plane generally at right angles to said transverse axis, said locking plate having an arcuate slot therein generally concentric with said transverse axis, a screw element fixed to the adjacent wall of said duct and extending through said arcuate slot, and locking means comprising a thumb nut engaging said screw element to selectively clamp said locking plate in selected positions relative to said arcuate slot.

4. Air flow regulating means for a rectangular ventilation duct comprising a damper plate and means mounting said plate in said duct for pivotal movement about a transverse axis, a locking plate fixed to said damper plate adjacent a marginal edge thereof and spaced from said transverse axis and extending in a plane generally at right angles to said transverse axis, said locking plate having an arcuate slot therein generally concentric with said transverse axis, means fixed to the adjacent wall of said duct and extending through said arcuate slot, and locking means engaging said last-mentioned means and manually movable to selectively clamp the same in selected positions relative to said arcuate slot.

5. Air flow regulating means for a rectangular ventilation duct comprising a damper plate and means mounting said plate in said duct for pivotal movement about a transverse axis, a locking plate attached to a side edge of said damper plate at a point spaced from said transverse axis, said locking plate lying adjacent to an interior wall of said duct in a plane at right angles to said pivot axis, said locking plate having an elongated slot therein extending along a line spaced from said transverse axis, a screw element fixed to said duct and extending through said elongated slot, and locking means comprising a thumb nut engaging said screw means to selectively clamp the same in selected positions relative to said elongated slot.

6. Air flow regulating means for a rectangular ventilation duct comprising a damper plate and means mounting said plate in said duct for pivotal movement about a transverse axis, a locking plate attached to said damper plate adjacent a marginal edge thereof and spaced from said transverse axis and extending in a plane generally at right angles to said transverse axis, said locking plate having an elongated slot therein extending along a line spaced from said transverse axis, means fixed to the adjacent wall of said duct and extending through said elongated slot, and locking means engaging said last-mentioned means and manually movable to selectively clamp the same in selected positions relative to said elongated slot.

References Cited in the file of this patent
UNITED STATES PATENTS 1,395,784    Alsfasser _____ Nov. 1, 1921